United States Patent
Zhao et al.

(10) Patent No.: US 7,751,279 B2
(45) Date of Patent: Jul. 6, 2010

(54) SUB-SALT REFLECTION TOMOGRAPHY AND IMAGING BY WALKAWAY VSP SURVEY

(75) Inventors: Xiaomin Zhao, Sugar Land, TX (US); Min Lou, Houston, TX (US); James C. Jackson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 573 days.

(21) Appl. No.: 11/697,049

(22) Filed: Apr. 5, 2007

(65) Prior Publication Data

US 2007/0259432 A1 Nov. 8, 2007

Related U.S. Application Data

(60) Provisional application No. 60/797,277, filed on May 3, 2006.

(51) Int. Cl.
*G01V 1/32* (2006.01)
(52) U.S. Cl. .............................. 367/57; 367/25; 367/38; 367/73
(58) Field of Classification Search .................. 367/31, 367/32, 57, 73, 25
See application file for complete search history.

(56) References Cited

U.S. PATENT DOCUMENTS

| | | | | |
|---|---|---|---|---|
| 3,371,310 A | * | 2/1968 | Silverman | 367/57 |
| 4,794,573 A | * | 12/1988 | Bell et al. | 367/57 |
| 4,835,745 A | * | 5/1989 | Young et al. | 367/56 |
| 4,918,670 A | * | 4/1990 | Wang | 367/38 |
| 4,926,393 A | | 5/1990 | McClellan et al. | |
| 5,170,377 A | * | 12/1992 | Manzur et al. | 367/73 |
| 5,307,268 A | * | 4/1994 | Wang et al. | 702/16 |
| 5,742,560 A | | 4/1998 | Krebs | |
| 5,995,446 A | * | 11/1999 | Meyer et al. | 367/25 |
| 6,382,332 B1 | * | 5/2002 | Eaton | 175/50 |
| 6,577,955 B2 | * | 6/2003 | Guillaume | 702/14 |
| 6,807,489 B2 | * | 10/2004 | Naville et al. | 702/17 |
| 6,894,949 B2 | * | 5/2005 | Aronstam | 367/57 |
| 6,917,564 B2 | * | 7/2005 | Leaney | 367/73 |
| 6,977,866 B2 | * | 12/2005 | Huffman et al. | 367/73 |
| 7,110,323 B2 | * | 9/2006 | Marmalyevskyy et al. | 367/37 |
| 7,586,811 B2 | * | 9/2009 | Banik | 367/73 |
| 2003/0130796 A1 | * | 7/2003 | Wiggins | 702/14 |

(Continued)

FOREIGN PATENT DOCUMENTS

WO WO0210798 A1 2/2002

OTHER PUBLICATIONS

Mark E. Willis et al.; A novel application of time-reversed acoustics: Salt-dome flank imaging using walkaway VSP surveys, Geophysics, vol. 71, No. 2, (Mar.-Apr. 2006), pp. A7-A11.

(Continued)

*Primary Examiner*—Scott A Hughes
(74) *Attorney, Agent, or Firm*—Mossman Kumar & Tyler PC

(57) ABSTRACT

A walkaway VSP survey is carried out with receivers located in a borehole near the base salt. Reflection tomographic inversion of data from the walkaway VSP is used to derive a velocity model for the subsurface and may be used for imaging of sub-salt reflections.

21 Claims, 12 Drawing Sheets

U.S. PATENT DOCUMENTS

2004/0068376 A1     4/2004     Aronstam
2005/0117451 A1*   6/2005     Robertsson ................ 367/24
2005/0122840 A1*   6/2005     Haldorsen ................ 367/57

OTHER PUBLICATIONS

M. Badri et al., Reservoir Imaging Beneath a High Velocity Layer Using Multi-Azimuth Walkaway VSP in the Mediterranean Sea, Egypt, SPE 37698. 1997 Middle East Oil Show, Bahran, Mar. 15-18, 1997, pp. 195-204.

A.M. Egwuenu et al., Improved Fluid Characterization for Miscible Gas Floods, SPE 94034, SPE Europec/EAGE Annual Conference, Madrid, Spain, Jun. 13-16, 2005, pp. 1-12.

Y. Li et al., Imaging Salt Bottom and Flanks from Interior of Salt Dome using a Walkaway VSP, EAGE 67th Conference & Exhibition, Madrid, Spain, Jun. 13-16, 2005, pp. 1-4.

Y. Li et al., Tomographic Velocity Determination of the Sedimentary and Salt Flank Images using Multifarious VSP data, SBGF, Eighth International Congress of the Brazilian Geophysical Society,, Sep. 14-18, 2003, pp. 1-6.

E. L. Salo et al., Traveltime inversion of both direct and reflected arrivals in vertical seismic profile data, Geophysics, vol. 54, No. 1 (Jan. 1989), pp. 49-56.

H. Zhou et al., A Reverse VSP Tomographic Velocity Analysis, SEG 2000 Expanded Abstracts, 2000, pp. 1-4.

Z. Zhang et al., Reconstruction of High-Resolution Velocity Models Using Joint Tomography of Crosswell and VSP Data, EAGE 63rd Conference & Technical Exhibition—Amsterdam, The Netherlands, Jun. 11-15, 2001, pp. 1-4.

J. Zhang et al., Nonlinear refraction traveltime tomography, Geopyysics, vol. 63, No. 5 (Sep.-Oct. 1998), pp. 1726-1737.

R. R. Stewart et al., Tomography-Based Imaging Using Well Logs, VSP, and 3-D Seismic Data, 57th Annual International Mtg., Soc. Expl. Geophys., Expanded Abstracts, 1987, pp. 849-851.

\* cited by examiner

SUB-SALT REFLECTION TOMOGRAPHY AND IMAGING BY WALKAWAY VSP SURVEY

CROSS-REFERENCES TO RELATED APPLICATIONS

This application claims priority from U.S. provisional patent application 60/797277 filed on 3 May 2006. The application is also related to an application being filed concurrently under Ser. No. 11/697,125.

BACKGROUND OF THE INVENTION

1. Field of the Invention

This invention relates to a method of geophysical prospecting which improves the accuracy of seismic migration. Specifically, the invention uses a walkaway VSP survey for determination of subsurface velocities and imaging of reflections below salt layers in the earth.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflector using a procedure known as migration.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver. Salt layers in the subsurface are particularly problematic. Due to the high compressional wave (P-wave) velocity of salt (4.48 km/s or 14,500 ft/s), there is considerable ray-bending of P-waves at the top and bottom of salt layers due to the large velocity contrast. Typical sedimentary velocities in the Gulf of Mexico may be no more than 3 km/s.

Numerous approaches have been taken to address the problem of sub-salt imaging. These include using low frequencies, use of prestack depth migration, use of converted waves, redatuming to the base salt reflection, and seismic inversion. These have had limited success.

The present invention uses a walkaway Vertical Seismic Profile (VSP) survey to estimate sub-salt velocities by tomographic inversion of reflection travel-times. In a walkaway VSP survey, measurements are made using a plurality of receivers in a borehole responsive to excitation of one or more seismic sources at a plurality of distances from the wellbore. The estimated velocities may then be used for migration of the walkaway VSP data or of surface seismic data. This method is particularly useful in the drilling of offset wells where an initial well that may or may not be productive has been drilled. Using the method of the present invention, it is possible to image the subsurface of the earth away from the initial well.

SUMMARY OF THE INVENTION

One embodiment of the invention is a method of estimating a property of an earth formation. The formation includes a first zone having a large impedance contrast with an overlying second zone. The method includes positioning a first sensor in the first zone, activating an energy source at a plurality of source positions at or near a surface of the earth, and recording signals from the first sensor responsive to the activation of the source. The recorded signals include a reflection from a lower surface of the first zone and an interface in the earth formation below the first zone. Travel-times are picked in the recorded signals corresponding to the reflections. The picked travel-times are used to estimate a position of the lower surface of the first zone, a position of the interface, and/or a velocity between the first zone and the interface. The first sensor may be positioned near the lower surface of the interface. The first zone may include salt. The picked travel-times may correspond to compressional wave travels-times. Estimating may be based on performing a tomographic inversion of the picked travel-times to give a velocity model. A wavefield separation of the recorded signal may be done. The method may further include identifying a zone of low-velocity. That method may further include migrating recorded signals using the velocity model. That method may further include performing drilling operations based on the velocity model.

Another embodiment of the invention is a system for estimating a property of an earth formation including a first zone having a large impedance contrast with an overlying second zone. The system includes an energy source configured to be activated at a plurality of source positions at or near a surface of the earth. A first sensor is configured to produce signals responsive to the activation of the source, wherein the produced signals include a reflection from a lower surface of the first zone and an interface in the earth formation below the first zone. A processor is configured to pick travel-times from the recorded signals corresponding to the reflections, and estimate from the picked travel-times a position of the lower surface of the first zone, a position of the interface and/or a velocity between the first zone and the interface. The first sensor may be positioned near the lower surface of the first zone. The first zone may include salt. The processor may be further configured to pick travel-times corresponding to compressional waves. The processor may be configured to perform a tomographic inversion of the picked travel-times to give a velocity model. The processor may be further configured to identify a zone of low-velocity in the earth formation. The processor may be further configured to migrate the recorded signals using the velocity model. The system may further include a processor configured to use the output of the migration for further drilling operations. The first sensor may include a 3-C sensor and/or a hydrophone. The first sensor may be conveyed in a borehole using a wireline.

Another embodiment of the invention is a computer-readable medium for use with a system for estimating a property of an earth formation including a first zone having a large impedance contrast with an overlying second zone. The system includes an energy source configured to be activated at a plurality of source positions at or near a surface of the earth. The system also includes a first sensor configured to produce signals responsive to the activation of the source, the produced signals including a reflection from a lower surface of the first zone, and an interface in the earth formation below the first zone. The medium includes instructions which enable a processor to pick travel-times in the recorded signals corresponding to the reflections, and estimate from the picked travel-times a position of the lower surface of the first zone, a position of the interface, and/or a velocity between the first zone and the interface. The medium may include a ROM, an EPROM, an EAROM, a flash memory, and an optical disk.

BRIEF DESCRIPTION OF THE DRAWINGS

The file of this patent contains at least one drawing executed in color: Copies of this patent with color drawing(s)

will be provided by the Patent and Trademark Office upon request and payment of the necessary fee. The present invention is best understood by reference to the attached figures in which like numerals refer to like elements, and in which:

FIG. 7b shows an initial model used for tomographic inversion of data corresponding to FIG. 7a;

DETAILED DESCRIPTION OF THE INVENTION

Figure 1:
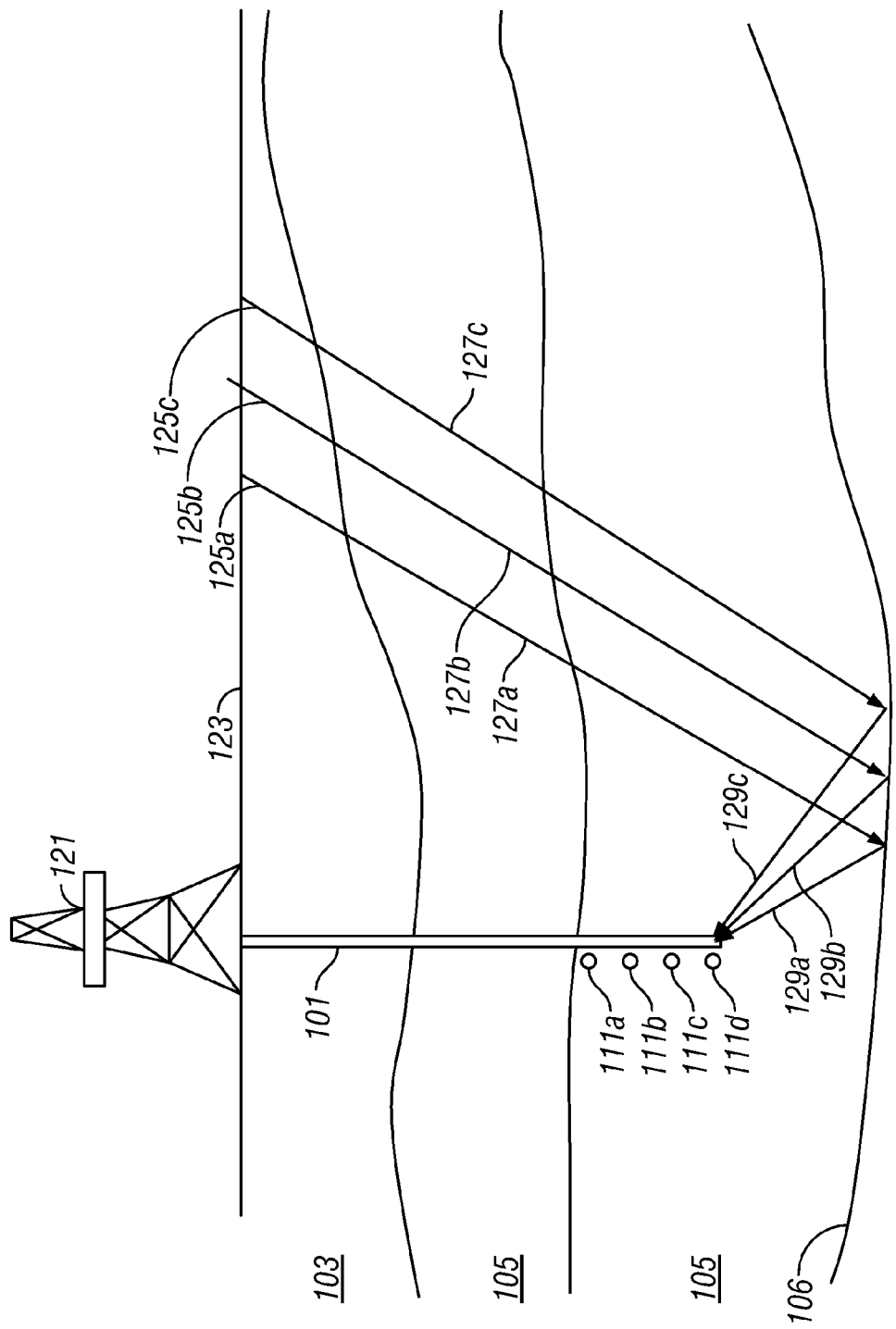
FIG. 1 illustrates the geometry of data acquisition of a walkaway VSP according to the present invention.

For the present invention, the acquisition geometry of a walkaway VSP is illustrated in FIG. 1. Shown therein is the surface of the earth 123 with a rig 121 thereon. This may be a drilling rig or it may be a mast rig which conveys a wireline into a borehole 101. The borehole 101 penetrates layers 103, 105 . . . . Positioned in the borehole 101 are seismic sensors denoted by 111a, 111b, 111c. 111d . . . . Each of the sensors may include a hydrophone, a single-component geophone or a multi-component geophone. Data for a single offset VSP is typically acquired using a single seismic source such as 125a at the surface (or within a body of water at the surface). For the purposes of this invention, a surface of a body of water is considered to be the surface of the earth. An exemplary raypath which depicts the propagation of seismic energy from the source 125a to a detector 111d is depicted by the ray 127a that is reflected from the bottom of layer 105 at the boundary 106 and reaches the receiver 111d along the raypath denoted by 129a.

In a typical VSP, data resulting from operation of a source at a single position such as 125a are recorded in each of the receivers 111a, 111b, 111c, 111d . . . in the borehole. Analysis of the reflected data can provide information about the seismic velocities in the subsurface and the configuration of the layer boundaries. In a walkaway VSP, this process is repeated for operation of the source at a plurality of source positions such as 125b, 125c . . . . Acquisition of data from a plurality of source positions at a plurality of detectors provides a redundant sampling of the subsurface region. This makes it possible to determine the velocity of the subsurface based on the travel-times for the rays between each of the sources and each of the receivers. This determination of velocity using travel-times is called "tomographic inversion" and numerous processing packages are commercially available that perform this tomographic inversion of seismic travel-time data.

Figure 2:
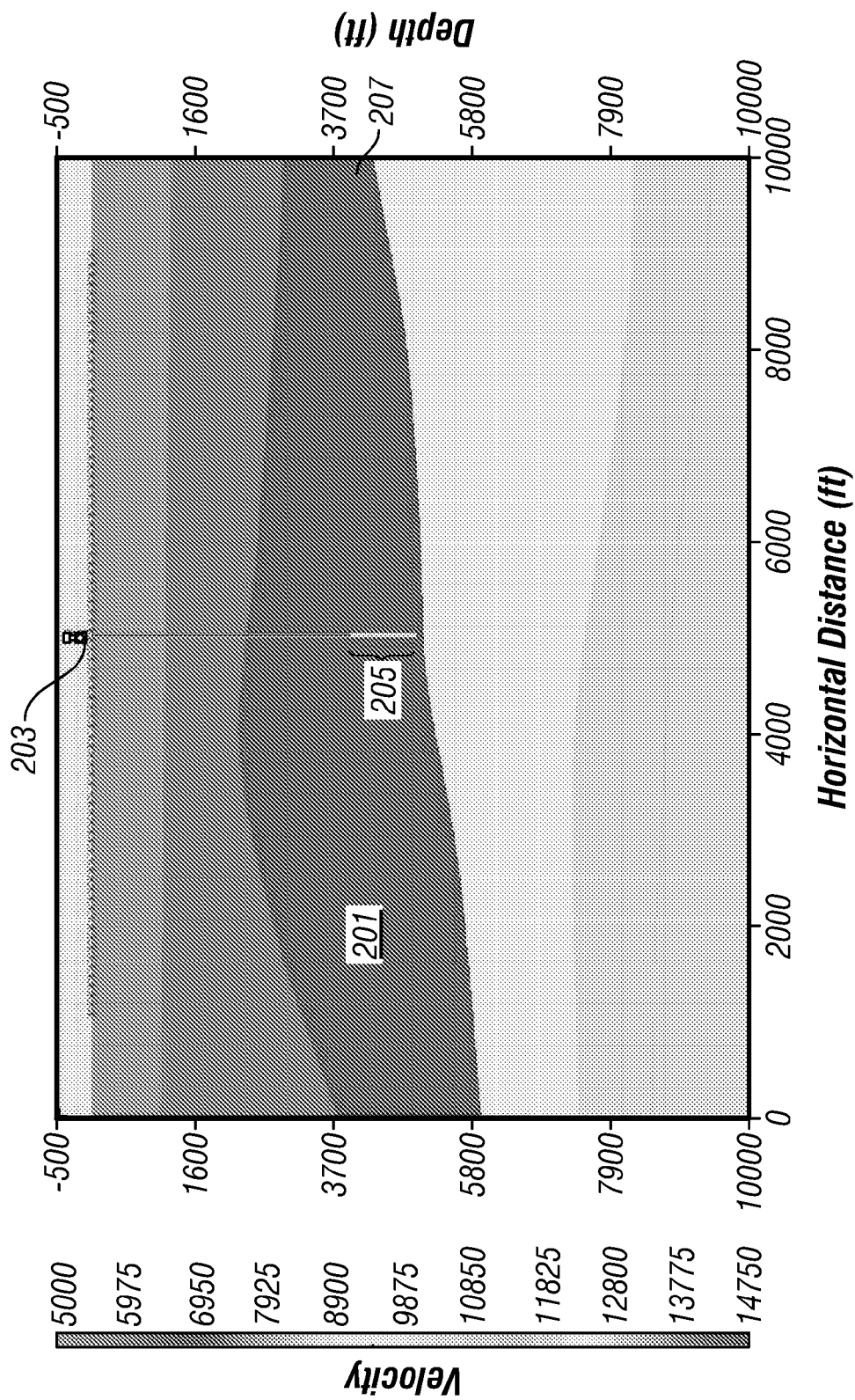
FIG. 2 is a display showing a velocity model used in simulation of a walkaway VSP.

A point of novelty of the present invention is the use of a walkaway VSP for the specific problem of imaging of sub-salt reflections in the earth. This is illustrated in FIG. 2 where a borehole 203 penetrates the earth formation. The abscissa is distance (the model has a lateral extent of 10,000 ft or 3.048 km) and ordinate is depth. The contours in the figure represent the P-wave velocities in the subsurface and, in particular, the formation 201 has a velocity of over 14,000 ft/s (4.3 km/s). Near the bottom of the borehole 203 an array of sensors 205 is deployed. One or more sensors is positioned within the salt.

Figure 3:
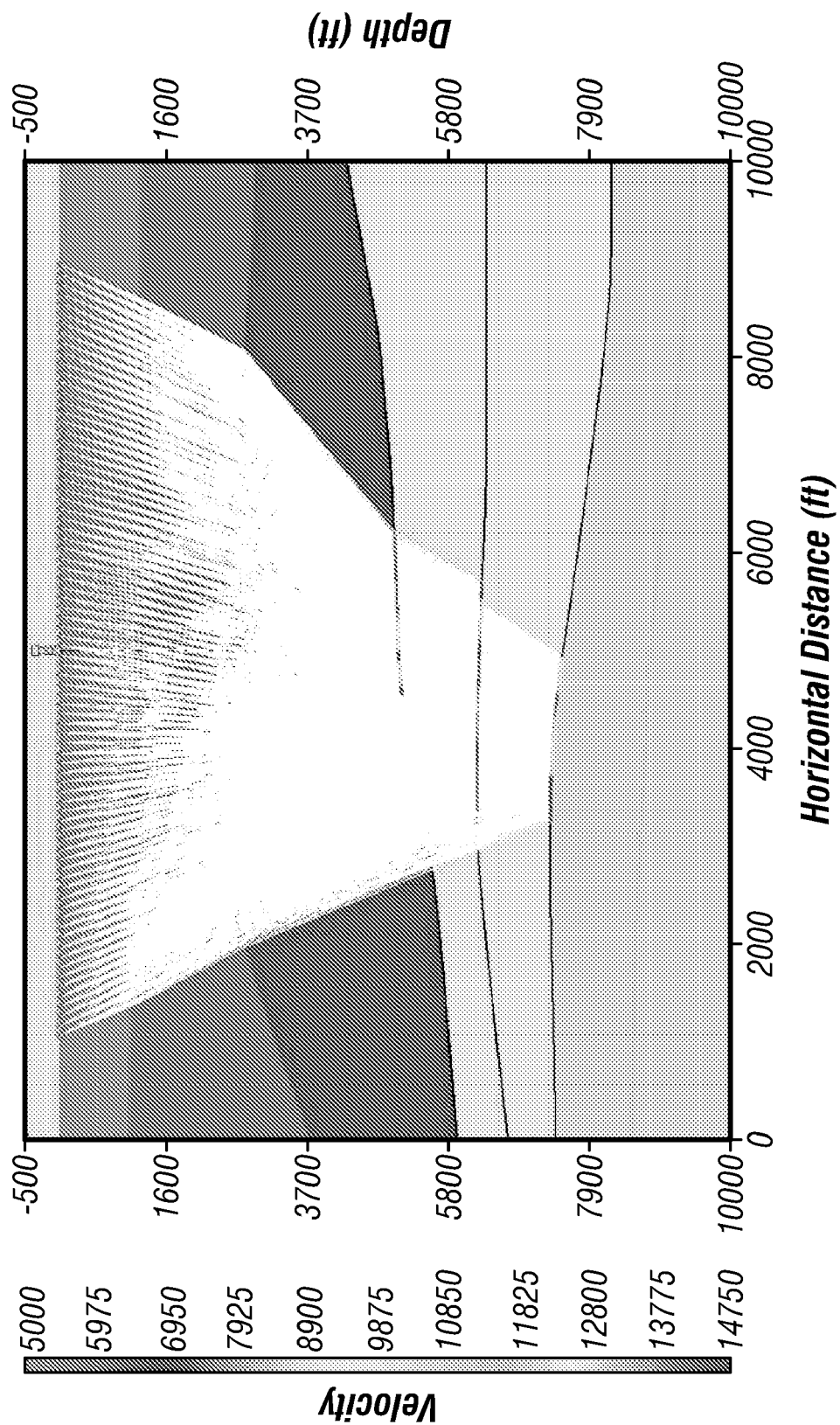
FIG. 3 shows an exemplary raypath geometry for the model of FIG. 2.

Using a suitable simulation package, a number of diagnostic displays may be generated. In the present invention, the simulation package that is used is the VECON™ package of GeoTomo Inc. This is not intended to be a limitation of the present invention. One of the displays that may be obtained is shown in FIG. 3 and shows the ray-paths corresponding to selected boundaries in the subsurface. In the example shown, the interval 210 is a salt layer that has a velocity much higher than the zone immediately above the salt. As would be known to those versed in the art, this results in a large impedance contrast at the top-salt boundary. Consequently, much of the seismic energy generated at the source is reflected at the top-salt, resulting in reduced energy propagating to layers below the salt. Another consequence of the high velocity is a significant ray-bending at the top-salt (see 211). The ray bending results in non-uniform coverage of the subsurface.

Figure 4:
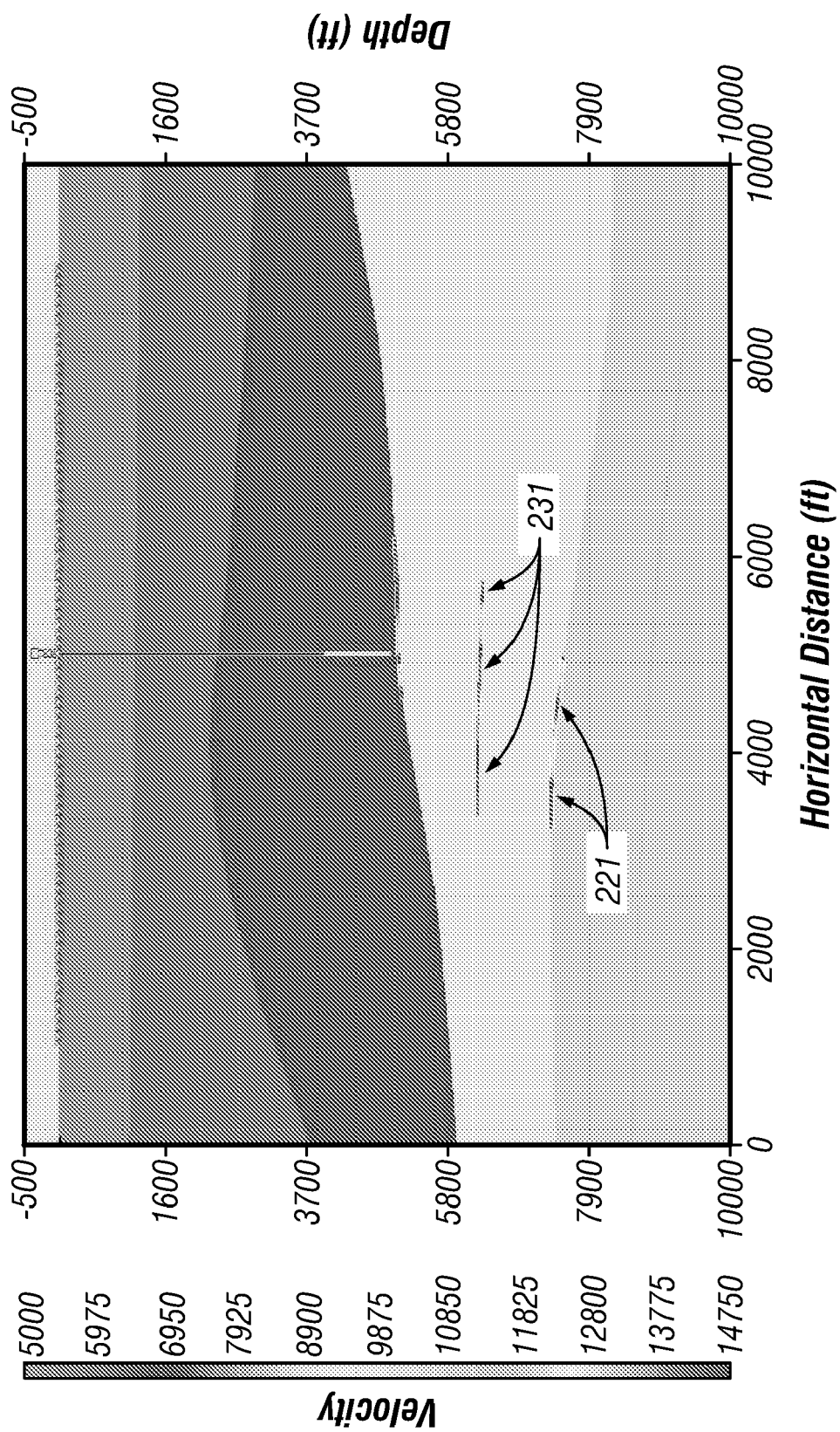
FIG. 4 shows the insonfication of sub-salt reflections obtained for the model of FIG. 2.

FIG. 4 shows, for the same model, the coverage obtained (or insonfication) of the boundaries. These are the dark lines 221, 231 in the figure and show that even with sources spread over approximately 8000 ft (See FIG. 3), only a small portion of the subsurface is insonified. The term "insonification" is analogous to the term illumination use with reference to a light source. The problems due to high velocity and large impedance contrast are not limited to salt and may occur, for example, with volcanic rocks such as basalt.

Figure 5:
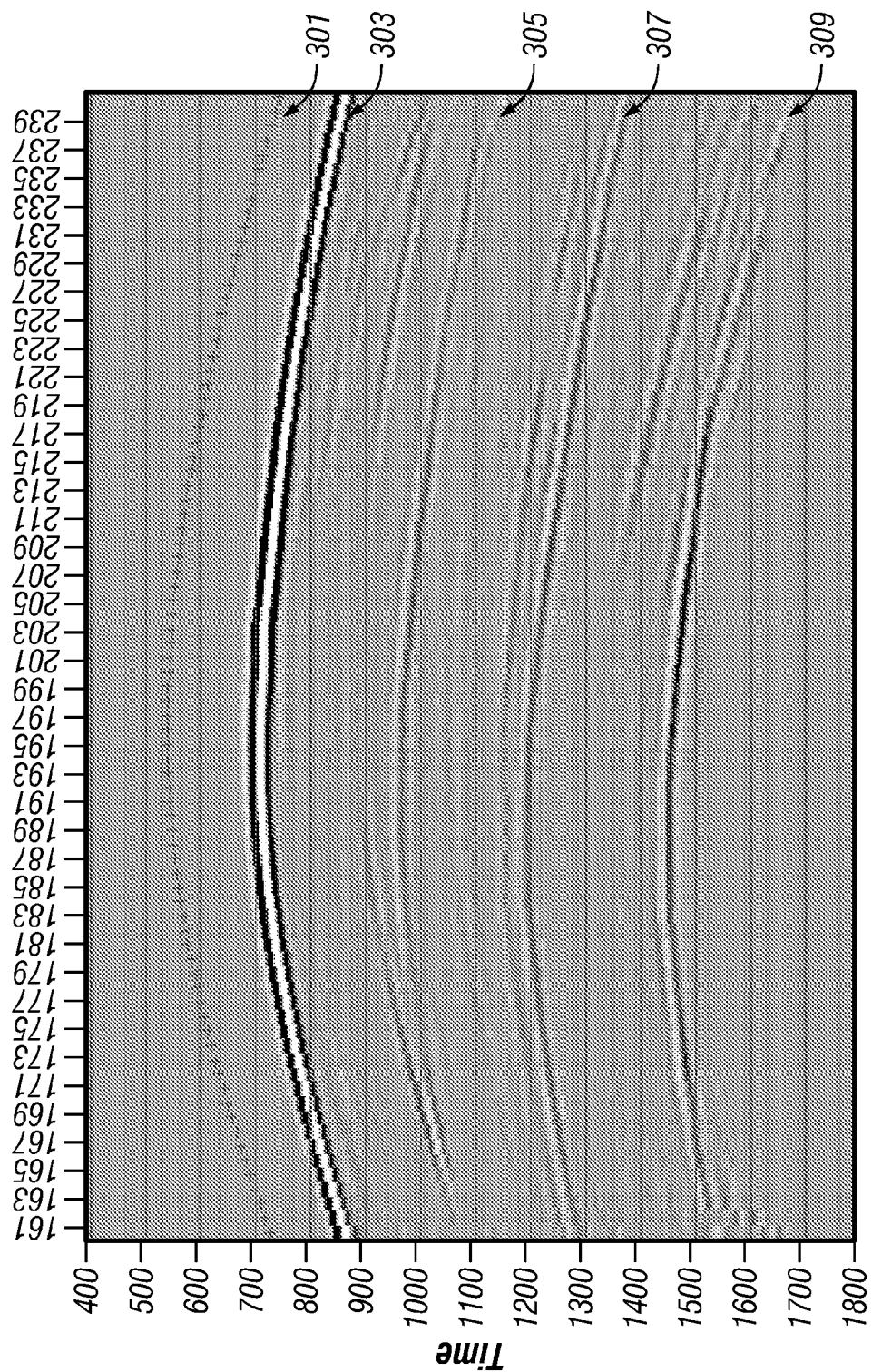
FIG. 5 is an exemplary simulated VSP data at a single depth for the model of FIG. 2.

An exemplary VSP at a single receiver position for the model of FIG. 2 is shown in FIG. 5. The ordinate is time and the abscissa corresponds to the source number at the surface. Depicted graphically are the time series of the signals at the selected depth for each of the source positions. The time series are simulated by a finite-difference solution of the elastic wave equation. The "event" identified as 301 is the direct arrival from the different source positions. The event 303 is a reflection from the base of the salt (207 in FIG. 2). Reflections from boundaries below the salt are indicated by 305, 307 and 309. The objective of the present invention is to map the velocities between these boundaries. While the example in FIG. 5 is for synthetic data, similar recordings would be obtained in the field for an actual VSP acquisition.

In order to accomplish this objective, travel-times corresponding to each of the "events" in data for a selected sensor depth (seen in the display of FIG. 5) and similar data for other depths are picked. This so-called "event picking" is well known in the art and typically involves a cross-correlation of a seismic trace with other seismic traces or with a reference signal. This can be considered to define a matrix of travel-times for each source position and each sensor positions of the form $$T = \begin{bmatrix} T_{1,1} & T_{1,2} & \cdots & T_{1,m} \\ T_{2,1} & T_{2,2} & \cdots & T_{2,m} \\ T_{3,1} & T_{3,2} & \cdots & T_{3,m} \\ \vdots & \vdots & \ddots & \vdots \\ T_{n-1,1} & T_{n-1,2} & \cdots & T_{n-1,m} \\ T_{n,1} & T_{n,2} & \cdots & T_{n,m} \end{bmatrix}, \quad (1)$$

where i is the shot index and j is the receiver index. Typically, but not always, the number of shot locations n is greater than the number of receiver locations m. A tomographic inversion of the travel-times is then carried out to define a velocity model for the subsurface. In addition to the first arrival time picking, the sub-salt reflection times (from an interface below the salt) need to be picked for reflection tomography. This can be done after wavefield separation. As can be seen in FIG. 5, the base salt and sub-salt reflections (303, 305, 307, and 309) can be easily identified and picked.

Tomography is derived from the Greek for "section drawing." The subsurface region is divided into cells and the data are expressed as line integrals along raypaths through the cells. Transmission tomography involves borehole-to-borehole, surface-to-borehole, or surface-to-surface observations. Reflection tomography involves surface-to-surface observations (as in conventional reflection or refraction work). In seismic tomography, slowness (or velocity), and sometimes an attenuation factor, is assigned to each cell and traveltimes (and amplitudes) are calculated by tracing rays through the model. The results are compared with observed times (and amplitudes); the model is then perturbed and the process repeated iteratively to minimize errors. Raypaths have to be recalculated after each change of assumed velocity.

Figure 6A:
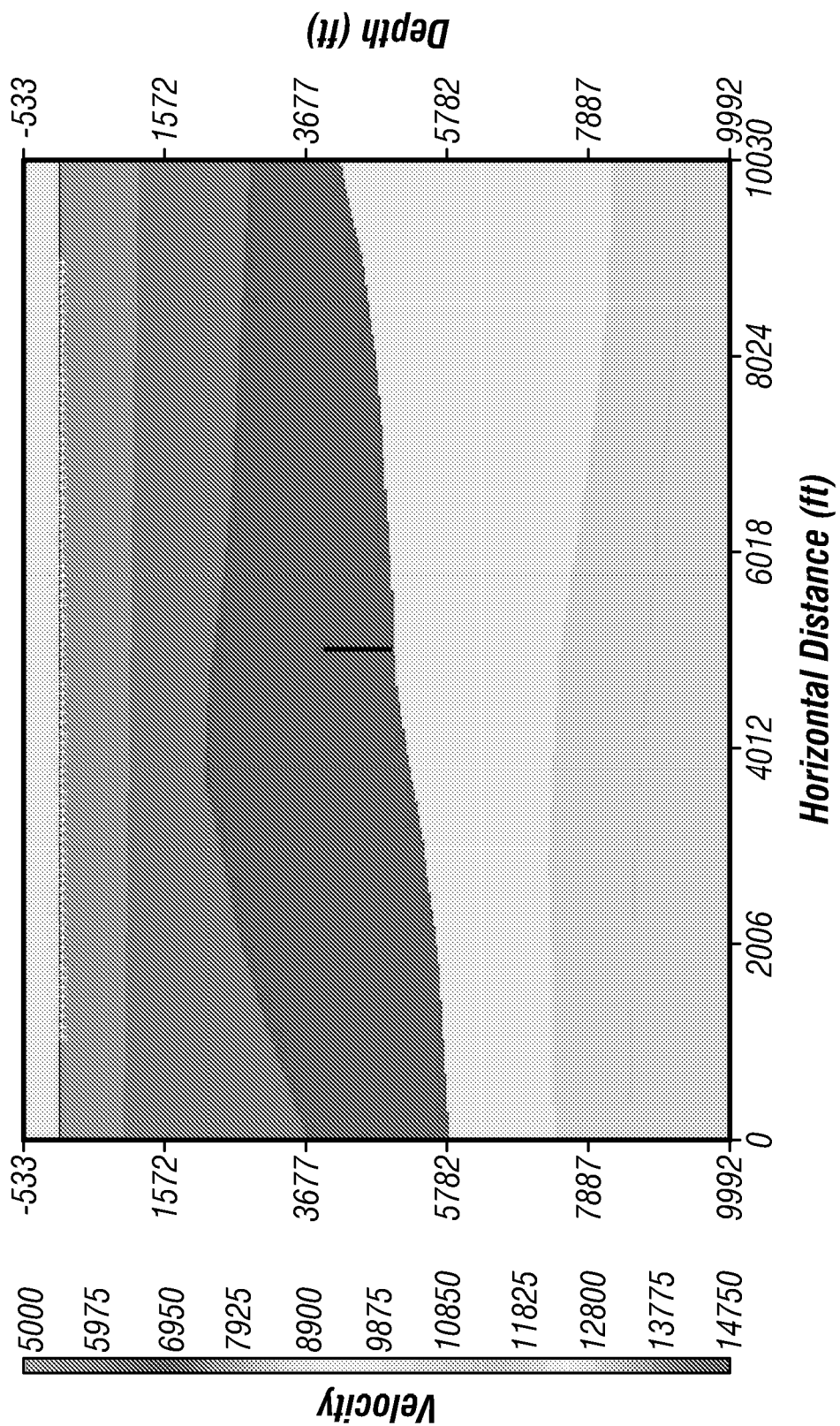
FIG. 6a shows an exemplary velocity model.
Figure 6B:
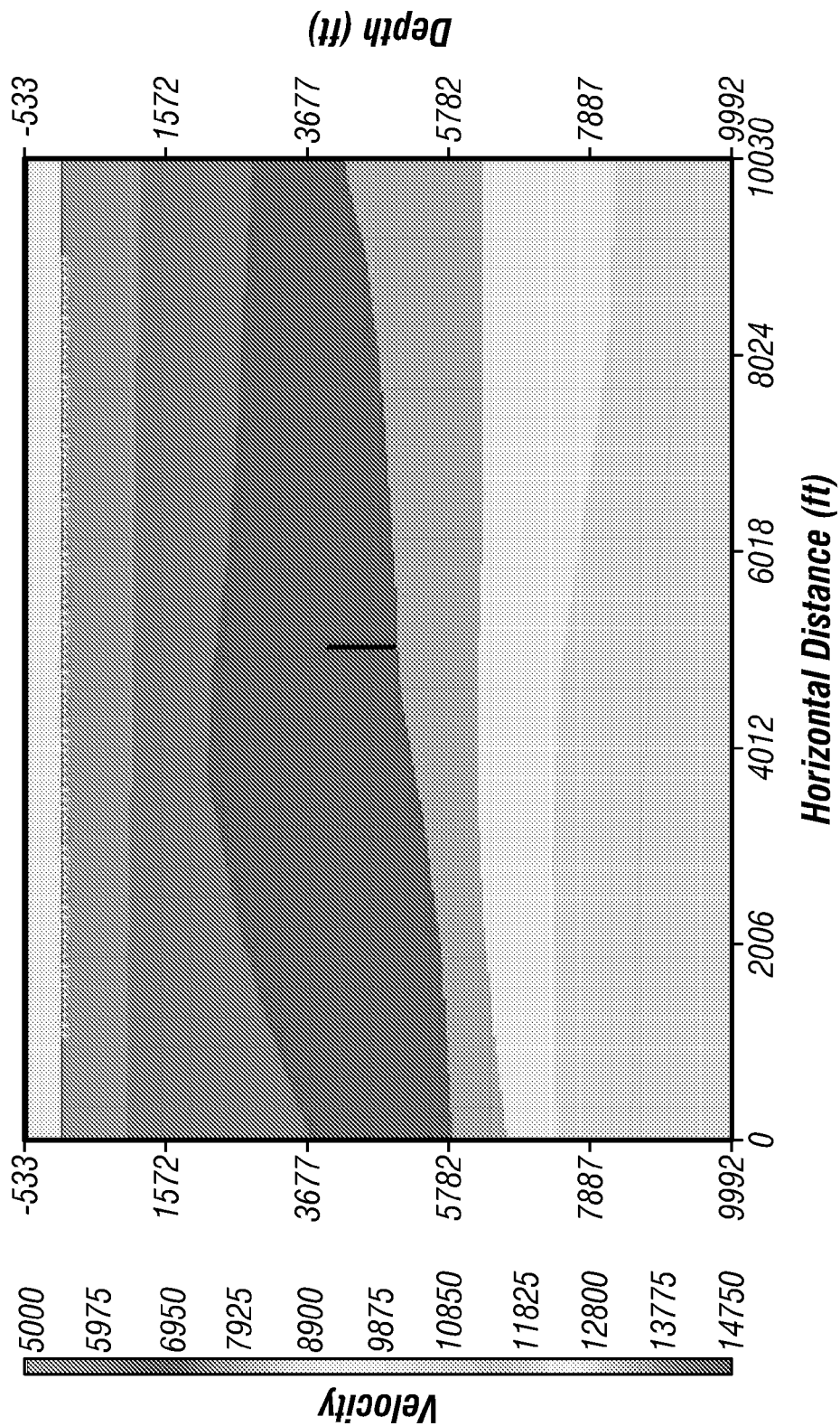
FIG. 6b shows an initial model used for tomographic inversion.
Figure 6C:
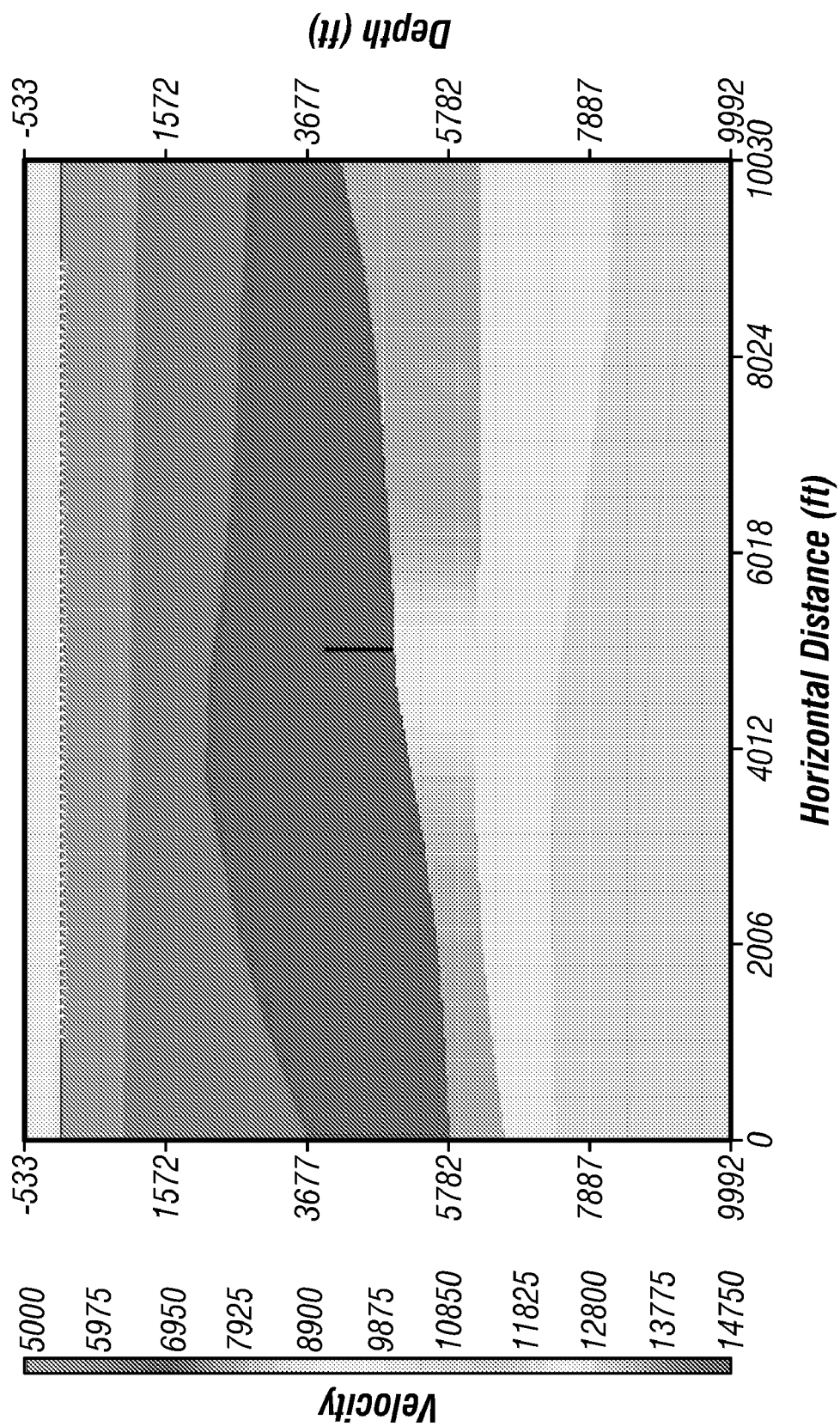
FIG. 6c shows the results of tomographic inversion of data simulated using the velocity model of FIG. 6a with an initial estimate shown in FIG. 6b.

The VELMAP™ package includes a reflection tomographic inversion algorithm. Shown in FIG. 6a is an exemplary velocity model that was used to generate a matrix of traveltimes. A reflection tomographic inversion of the resulting travel-time matrix was then carried out using the initial velocity model of FIG. 6b. The resulting output of the reflection tomographic inversion is shown in FIG. 6c. The largest change between the initial model FIG. 6b and the end result of the inversion is in the region indicated by 351 where the inverted velocity closely matches the actual velocity in FIG. 6a. This is to be expected as FIGS. 3 and 4 show the best insonification of reflectors in this region. There is no change in the velocities at the edges of the model between FIG. 6b and FIG. 6c for the simple reason that the raypaths do not pass through the edges of the model.

Figure 7A:
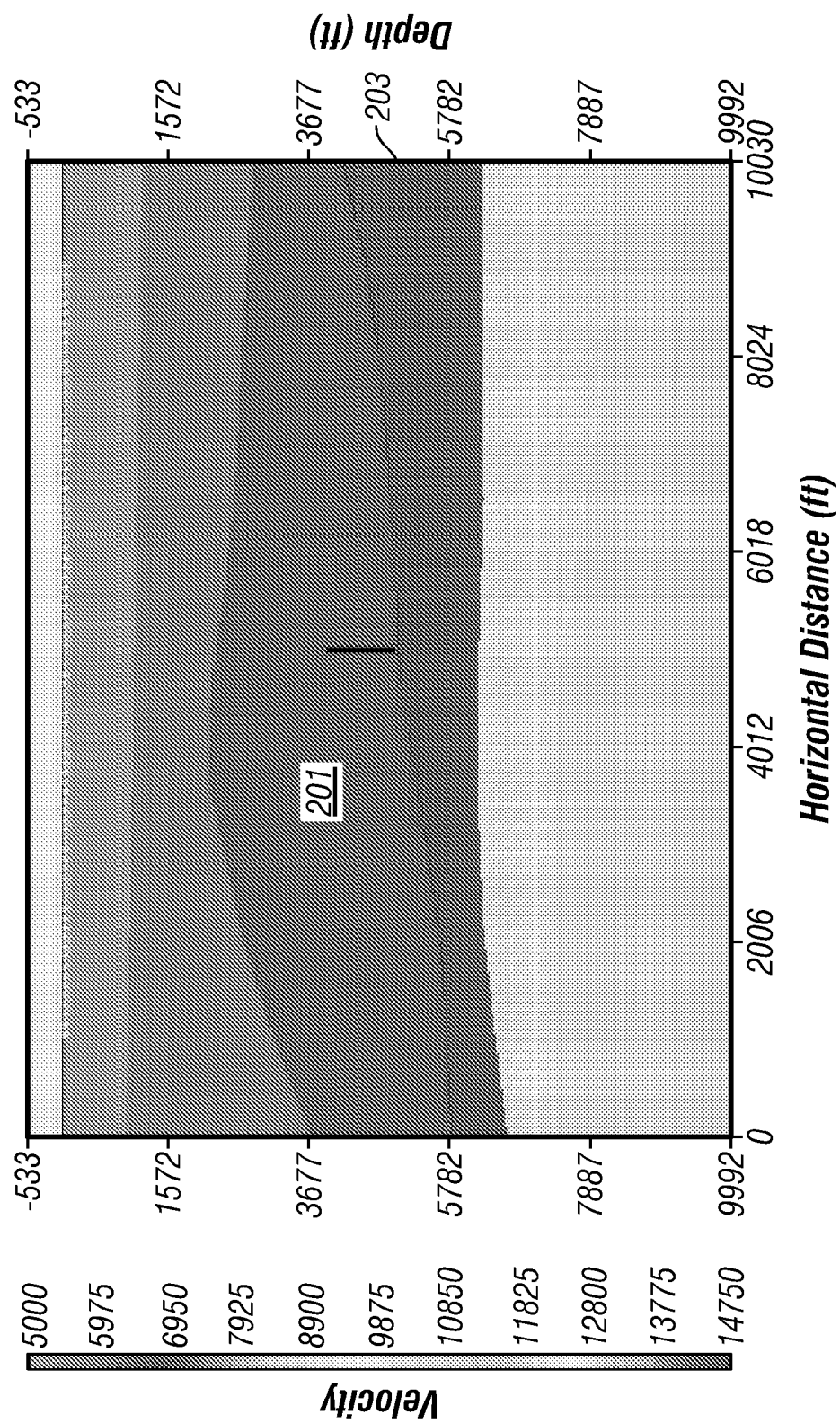
FIG. 7a shows an exemplary velocity model with abnormally low velocity immediately below the salt layer.

FIG. 7a is an exemplary model in which the salt 201 is underlain by a low-velocity zone 203. Such low-velocity zones are usually due to overpressured formations and commonly lie below thick impermeable formations such as salt. The term "overpressuring" refers to abnormally high pore-fluid pressure in the formation. Drilling into an overpressured zone is a common cause of well blowouts. Being able to predict such overpressuring prior to drilling is thus very valuable.

Figure 7B:
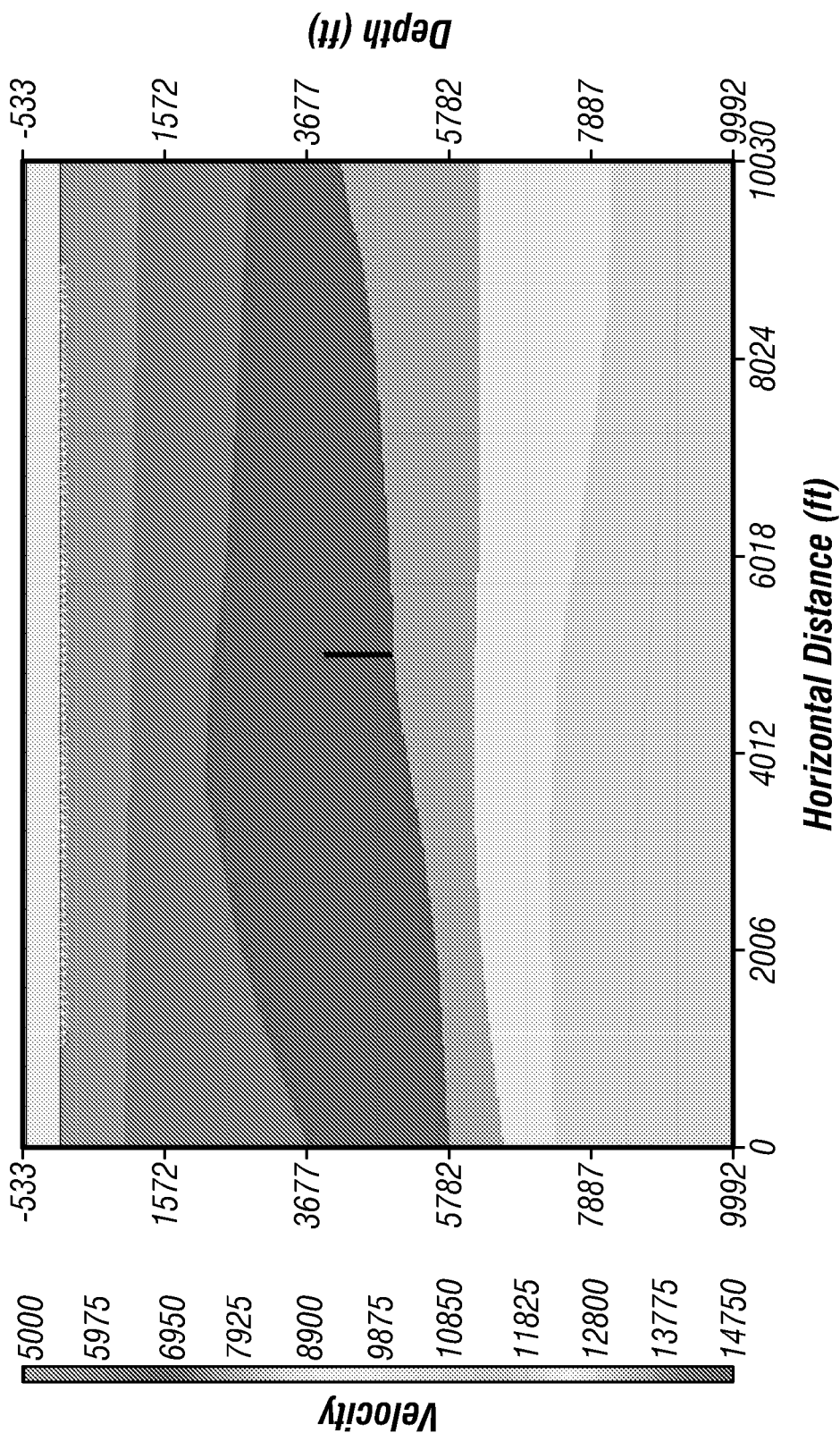
Figure 7C:
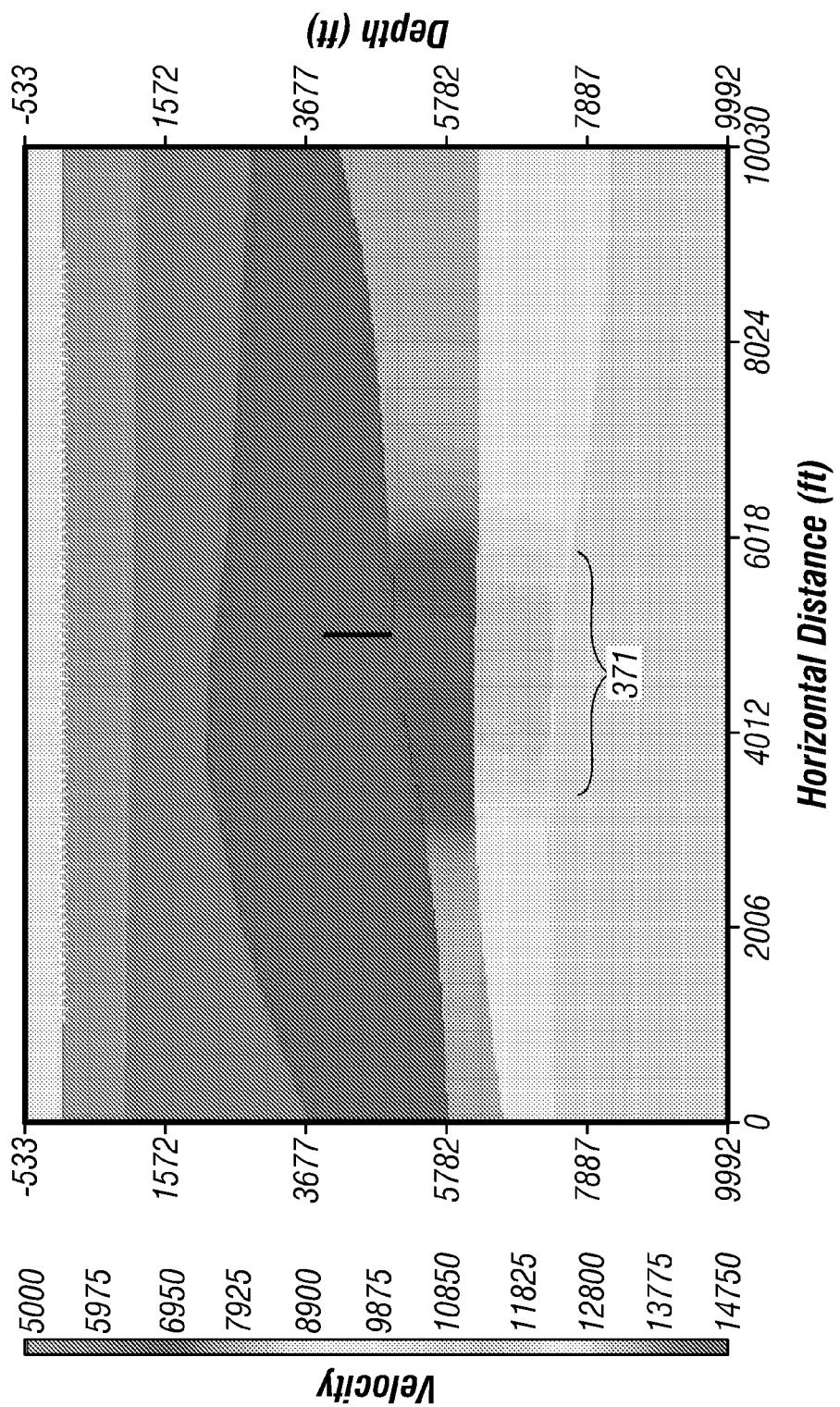
FIG. 7c shows the results of tomographic inversion of data simulated using the velocity model of FIG. 7a with an initial estimate shown in FIG. 7b.

Travel-time data were generated using the model of FIG. 7a. A reflection tomographic inversion of the travel-time data was carried out using the initial velocity model of FIG. 7b. The result is shown in FIG. 7c. The low velocity zone 371 immediately below the bottom of the well is clearly seen. As would be known to those versed in the art, seismic velocities in earth formations are a function of the effective stress (difference between overburden stress and the formation pore pressure). In an overpressured formation, the formation pore pressure is high so that the effective stress is lowered. Consequently, the seismic velocity in an overpressured zone is low. Identifying such overpressured zones ahead of the drillbit is extremely helpful in avoiding blowouts since remedial action such as increasing the mud weight used in drilling can be done.

Figure 8:
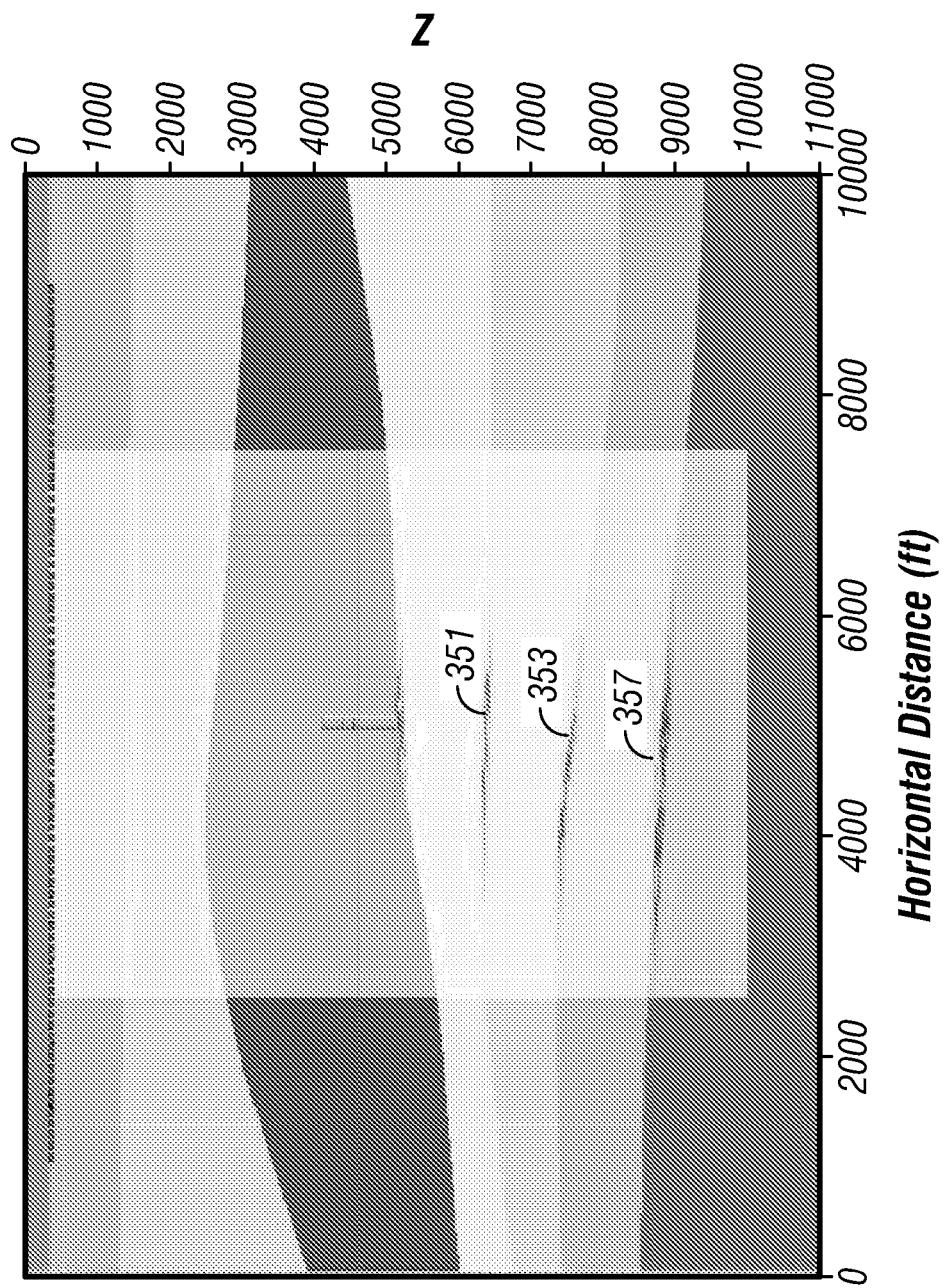
FIG. 8 shows a migrated walkaway VSP data superimposed on the velocity model.

Based on the estimated sub-salt velocity distributions, we apply a pre-stack Kirchhoff migration to the synthetic seismic data to image the sub-salt interfaces. In the migration, we employ an accurate and stable fast marching method to calculate the travel time table (Lou, 2006). FIG. 8 is the migration result for the synthetic seismograms of all the receiver gathers from the walkaway VSP survey. By overlapping the migration result onto the true velocity model, we can see that the migration images the three sub-salt interfaces 351, 353, 357 correctly and robustly, which demonstrates the validity and effectiveness of the invention. In particular, it reinforces faith in the velocity model and an interpreted overpressured zone.

In one embodiment of the invention, the borehole is drilled to a depth just above the anticipated base salt depth. A wireline with a plurality of sensors is conveyed into the borehole and a walkaway VSP is done. A velocity model is determined as described above from the walkaway VSP. Reflecting interfaces are identified ahead of the bottom of the borehole and the sub-salt velocity determined. Drilling may then be resumed with appropriate selection of mud weight for expected sub-salt pore-pressure conditions with the drilling direction based on the newly-determined sub-salt reflecting interfaces. Alternatively, the walkaway VSP may be done during the drilling of the borehole.

The inversion and migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of estimating a property of an earth formation including a first zone having a large impedance contrast with an overlying second zone, the method comprising:
   (a) positioning a first sensor in the first zone, wherein the first zone comprises salt;
   (b) activating an energy source at a plurality of source positions at or near a surface of the earth;
   (c) recording signals from the first sensor responsive to said activating of the source, the recorded signals including a reflection from: (A) a lower surface of the first zone, and (B) an interface in the earth formation below the first zone;
   (d) picking travel-times in the recorded signals corresponding to the reflections; and
   (e) estimating from the picked travel-times at least one of (i) a position of the lower surface of the first zone, (ii) a position of the interface; and (iii) a velocity between the first zone and the interface.

2. The method of claim 1 further comprising positioning the first sensor near the lower surface of the first zone.

3. The method of claim 1 wherein positioning the first sensor further comprises positioning a plurality of sensors.

4. The method of claim 1 wherein the picked travel-times correspond to compressional wave travel-times.

5. The method of claim 1 wherein the estimating further comprises performing a tomographic inversion of the picked travel-times to give a velocity model.

6. The method of claim 5 further comprising identifying a zone of low-velocity in the earth formation.

7. The method of claim 5 further comprising migrating recorded signals using the velocity model.

8. The method of claim 7 further comprising performing drilling operations based on the velocity model.

9. The method of claim 1 further comprising performing a wave-field separation of the recorded signals prior to step (d).

10. A system for estimating a property of an earth formation including a first zone having a large impedance contrast with an overlying second zone, the system comprising:

an energy source configured to be activated at a plurality of source positions at or near a surface of the earth;

a first sensor configured to produce signals responsive to the activation of the source, the produced signals including a reflection from: (A) a lower surface of the first zone, and (B) an interface in the earth formation below the first zone, wherein the first zone comprises salt;

a processor configured to:

(A) pick travel-times in the recorded signals corresponding to the reflections; and (B) estimate from the picked travel-times at least one of (I) a position of the lower surface of the first zone, (II) a position of the interface, and (III) a velocity between the first zone and the interface.

11. The system of claim 10 wherein the first sensor is positioned near the lower surface of the first zone.

12. The system of claim 10 wherein the first sensor further comprises a plurality of sensors.

13. The system of claim 10 wherein the processor is further configured to pick travel-times corresponding to compressional waves.

14. The system of claim 10 wherein the processor is configured to do the estimating by further performing a tomographic inversion of the picked travel times to give a velocity model.

15. The system of claim 14 the processor is further configured to identify a zone of low-velocity in the earth formation.

16. The system of claim 15 wherein the processor is further configured to migrate the recorded signals using the velocity model.

17. The system of claim 16 further comprising a processor configured to use the output of the migration for further drilling operations.

18. The system of claim 10 wherein the first sensor further comprises at least one of (i) a 3-C sensor, and (ii) a hydrophone.

19. The system of claim 10 wherein the first sensor is conveyed in a borehole using a wireline.

20. A computer-readable medium product having stored thereon instructions that when read by at least one processor, cause the processor to perform a method comprising:

picking travel-times in signals produced at a first sensor responsive to the activation of an energy source at a plurality of source positions at or near a surface of the earth, the produced signals including a reflection from: (A) a lower surface of the first zone, and (B) an interface in the earth formation below the first zone, wherein the first zone comprises salt; and estimating from the picked travel-times at least one of (I) a position of the lower surface of the first zone, (H) a position of the interface; and (III) a velocity between the first zone and the interface.

21. The medium of claim 20 further comprising at least one of (i) a ROM, (ii) an EPROM, (iii) an EAROM, (iv) a flash memory, and (v) an optical disk.

\* \* \* \* \*